Patented June 3, 1952

2,598,692

UNITED STATES PATENT OFFICE 2,598,692

MANUFACTURE OF SODIUM 2,4,5-TRICHLOROPHENOXYACETATE

Gustav J. Henrich, Niagara Falls, N. Y., assignor to Mathieson Chemical Corporation, a corporation of Virginia No Drawing. Application May 2, 1950, Serial No. 159,641

4 Claims. (Cl. 260—521)

My invention relates to improvements in the production of 2,4,5-trichlorophenoxyacetic acid by condensation of the sodium salt of 2,4,5-trichlorophenol and sodium chloroacetate followed by separation and acidification of the resulting sodium 2,4,5-trichlorophenoxyacetate.

Conventionally, the manufacture of 2,4,5-trichlorophenoxyacetic acid through its sodium salt involves the reaction of the 2,4,5-trichlorophenol dissolved in alkali with a solution of sodium chloroacetate by mixing the materials and evaporating the mixture to dryness. Good yields are obtained by baking the mixture to dryness, but the baking and subsequent removal and handling of the dry solid product present obvious mechanical and engineering difficulties and result in higher unit costs than in the corresponding manufacture of 2,4-dichlorophenoxyacetic acid through its sodium salt. The production of 2,4-dichlorophenoxyacetic acid by contrast is effected satisfactorily in solution due to the good solubility of the reactants and the reasonable solubility of the sodium 2,4-dichlorophenoxyacetate product.

Sodium 2,4,5-trichlorophenoxyacetate, however, is so insoluble in water that its separation clogs the equipment with a thick, unworkable, solid mass and interferes with the completeness of the reaction. The use of sufficiently dilute solutions of the starting materials to maintain the reaction mixture in a fluid state susceptible of handling is unsatisfactory because yields are reduced, reaction time is prolonged, and the excessive dilution required necessitates a marked increase in capital and operating costs by increasing equipment size while reducing unit quantity of product. Consequently, conventional practice has found it easier to mix dilute solutions of the starting materials and drive the reaction to substantial completeness in a system permitting evaporation to dryness.

According to my invention the disadvantages characteristic of the baking method producing a solid product are avoided and yield and rate of reaction are increased over attempted solution methods of operation. This is accomplished by mixing aqueous alkaline solutions of the reactants in controlled concentration and conducting the reaction in a relatively concentrated slurry medium at elevated temperature, avoiding loss of water and with the addition of controlled amounts of water or brine during the course of the reaction in order to prevent the reaction mixture from thickening to a solid unworkable mass. I have found that by starting the reaction with a mixture containing less water than is required to maintain the reaction mixture in a fluid state throughout the reaction and diluting the mixture after the reaction has been initiated and carried to a substantial extent but while it is still sufficiently fluid to flow as a liquid and to permit agitation by the usual means, the yield of product is substantially increased over that obtained when all of the water is added at the start. The reaction rate is significantly improved so that the economics of the process are benefited. The physical form of the product is benefited, particularly with respect to subsequent separations by filtration and particularly as compared to the product obtained by the baking method.

For example, unless dilution during the reaction is employed the original concentration of reactants must include upwards of 75 moles of water; e. g., 108 moles per mole of sodium chloroacetate, in order to avoid transforming the reaction mixture to a thick unworkable solid mass. When the water in the original charge is held to this minimum, the yield is substantially less than is obtained according to my invention. When dilution during the reaction is employed according to my invention the amount of water required in the original charge may be reduced to as low as about 30 moles per mole of chloroacetate. Yield is improved and the reaction rate is increased as a result. For example, using an initial concentration of about 41 moles of water followed by dilution according to my invention in comparison to using 108 moles of water in original admixture, the reaction proceeds in shorter time and the yield is about 77 per cent instead of about 65 per cent.

According to my invention, an aqueous mixture containing the sodium salt of 2,4,5-trichlorophenol and sodium chloroacetate, usually with excess alkali and containing not more than about 50, and advantageously about 30 to 45, moles of water for each mole of sodium chloroacetate is formed. The mixture is reacted at elevated temperature; e. g., about 90°–104° C., for about 1½–3 hours, and the reaction mixture is maintained in liquid slurry form by dilution with water after the reaction has been carried to a substantial degree of completion. Usually, a minimum of about 75 moles of water per mole of sodium chloroacetate is required, or an addition of about 25 to about 50 additional moles of water. The reaction is continued and the solid product is recovered by physical separation from the reaction mixture at the completion of the reaction period. Usually the hot reaction mixture is passed to a filter or centrifugal separator. Advantageously the filtrate or separated reaction liquor is cooled to precipitate additional product for recovery by refiltration or recentrifugation.

Water may be used as the reaction diluent because of the very low solubility of the sodium 2,4,5-trichlorophenoxy acetate. Since water is eventually discharged from the process it is particularly advantageous, however, to utilize as the reaction diluent a brine solution containing sodium chloride in the approximate concentration produced by reaction of the original starting materials. Sodium 2,4,5-trichlorophenoxyacetate is substantially insoluble in brine solution containing about 8 to 10 per cent or more of sodium chloride based on the salt and water present in the mixture. This material can be discarded without significant loss, but I have found that product loss can be still further reduced by employing a brine reaction diluent which comprises recycled separated reaction liquor.

Upon completion of the reaction and before the separation step, it is advisable to adjust the pH of the reaction mixture to about 10 by the addition of caustic in order to avoid separation of a product containing 2,4,5-trichlorophenoxyacetic acid in admixture with the sodium salt and thus protect product quality and reduce losses to a minimum. The sodium salt product may be converted, for example, to the free acid which usually is the desired product by dissolving the sodium salt in water or 50 per cent methanol and by acidifying the solution with a dilute acid such as sulfuric acid. The precipitated organic acid is removed by filtration or centrifuging, is washed and is dried.

My invention will be further illustrated in the following illustrative examples:

Example I 1280 parts of 2,4,5-trichlorophenol were dissolved in 1360 parts of 19.1 percent aqueous caustic soda. 472 parts of monochloroacetic acid were separately dissolved in 610 parts of 32.8 percent aqueous caustic soda. The solutions were mixed and contained water and sodium chloroacetate in a molar ratio of about 19 to 1. The solution was heated under reflux for about 1.25 hours, and at that time was diluted with 4830 parts of 8 percent aqueous salt solution. The refluxing was continued for a total time of refluxing of about 3 hours. The crystals of sodium 2,4,5-trichlorophenoxyacetate which separated were very fibrous and easily filtered. The cake was washed with 8 percent salt solution and dried. The yield, based on the chloroacetic acid used, was 75.3 percent.

In an exactly comparable run except that the diluent brine was added initially to the reaction mixture, a yield of only 63.8 percent was obtained.

A portion of the sodium 2,4,5-trichlorophenoxyacetate produced according to the first paragraph of this example was dissolved in 50 percent methanol and acidified with dilute sulfuric acid. The precipitated 2,4,5-trichlorophenoxyacetic acid was filtered, washed and dried. It was a product of high purity.

Example II

The procedure of Example I was followed, adding the 8 percent brine as diluent after the reaction mixture had refluxed for about 1 hour. The total number of moles of water after dilution was about 77 moles. The yield was 80.5 percent based on the chloroacetic acid and the product was 97 percent sodium 2,4,5-trichlorophenoxyacetate.

Example III

The previous example was repeated except that water instead of brine was used as the diluent. A yield of 72.3 percent was obtained and the product contained about 93.5 percent of sodium 2,4,5-trichlorophenoxyacetate.

In each of the above examples, the reaction mixture was readily pumpable and stirrable as a slurry in the reaction vessel.

Example IV

In another run the molar ratio of water to chloroacetic acid was 41.6 to 1 before dilution and 74 to 1 after dilution with water. The reaction mixture after refluxing was filtered hot and the cold filtrate refiltered. The combined solids when washed and dried represented a yield of 82.8 per cent.

Thus my invention provides a method for manufacturing sodium 2,4,5-trichlorophenoxyacetate of improved convenience and greatly reduced cost in terms of product handling. In addition the product of my invention is more flocculent and therefore is easier to handle in subsequent operations than the conventional baked product. Compared to proposed aqueous systems analogous to those used in sodium 2,4-dichlorophenoxyacetate production, my invention provides economies in equipment size and process capacity, improved yields and higher reaction rates which reduce the time of reaction significantly.

I claim:

1. In the manufacture of sodium 2,4,5-trichlorophenoxyacetate by condensation of 2,4,5-trichlorophenol and chloroacetic acid in alkaline solution, the improvement which comprises forming an aqueous mixture containing sodium 2,4,5-trichlorophenate and sodium chloroacetate in approximately stoichiometric proportions and which contains from about 19 to about 50 moles of water to 1 mole of the sodium chloroacetate, reacting the mixture at elevated temperature for about 3 hours, maintaining the mixture in liquid slurry form by adding water during the course of the reaction in an amount at least sufficient to bring the total quantity of water used in the process to about 74 moles to 1 mole of sodium chloroacetate and recovering the solid product by separation from the reaction mixture.

2. In the manufacture of sodium 2,4,5-trichlorophenoxyacetate by condensation of 2,4,5-trichlorophenol and chloroacetic acid in alkaline solution, the improvement which comprises forming an aqueous mixture containing sodium 2,4,5-trichlorophenate and sodium chloroacetate in approximately stoichiometric proportions and which contains about 30 to 45 moles of water to 1 mole of the sodium chloroacetate, reacting the mixture at elevated temperature for about 3 hours, maintaining the mixture in liquid slurry form by adding water during the course of the reaction in an amount at least sufficient to bring the total quantity of water used in the process to about 74 moles to 1 mole of sodium chloroacetate and recovering the solid product by separation from the reaction mixture.

3. The method of claim 2 in which the dilution is effected with brine containing about 8 to 10 per cent sodium chloride.

4. The method of claim 2 in which the dilution water comprises separated reaction liquor.

GUSTAV J. HENRICH.

REFERENCES CITED

The following references are of record in the file of this patent:

UNITED STATES PATENTS

| Number | Name | Date |
|---|---|---|
| 2,516,611 | Berhenke et al. | July 25, 1950 |

FOREIGN PATENTS

| Number | Country | Date |
|---|---|---|
| 573,476 | Great Britain | Nov. 22, 1945 |
| 573,479 | Great Britain | Nov. 22, 1945 |
| 573,510 | Great Britain | Nov. 23, 1945 |
| 592,827 | Great Britain | Sept. 30, 1947 |

OTHER REFERENCES

Pokorny, J. Am. Chem. Soc., vol. 63, p. 1768 (1941).